June 13, 1944.  E. W. GENT  2,351,328
AIR MOTOR
Filed Feb. 28, 1942  2 Sheets-Sheet 1

INVENTOR
E. W. GENT
BY J. MacDonald
ATTORNEY

June 13, 1944.  E. W. GENT  2,351,328
AIR MOTOR
Filed Feb. 28, 1942   2 Sheets-Sheet 2

INVENTOR
E. W. GENT
BY J. MacDonald
ATTORNEY

Patented June 13, 1944

2,351,328

UNITED STATES PATENT OFFICE 2,351,328

AIR MOTOR

Edgar W. Gent, Morristown, N. J., assignor to Bell Telephone Laboratories, Incorporated, New York, N. Y., a corporation of New York Application February 28, 1942, Serial No. 432,867

7 Claims. (Cl. 253—59)

This invention relates to motors and more specifically to air motors of the turbine type.

The object of the invention is the provision of an air turbine which is particularly well adapted for use for example in pneumatic ticket distributing systems for actuating ticket receiving and dispatching apparatus while being cheap to manufacture, economical in upkeep and highly efficient in operation.

A feature of the invention is an air motor or turbine in which a casing serves as a mounting for a rotor wheel and for a peripherally notched wheel disposed in coaxial relation to the rotor wheel, the notched wheel serving to direct streams of air against fins at the periphery of the rotor wheel to cause its operation.

Another feature is the provision of means in the form of a gear mechanism for transmitting the movement of the rotor wheel to a centrifugal operating clutch device and thereby to a power take-off element.

Another feature is the provision of means in the form of a manually operating mechanism for adjusting the notched wheel relative to the rotor wheel for compensating for variation in the velocity of the air entering the casing of the turbine in order to secure a substantially uniform operation of the rotor wheel and that of the apparatus actuated thereby, the operation of the manually operable means being effective to position a dial for indicating the adjustment of the notched wheel and the rotor wheel in relation to the pressure variation of the air operating the rotor wheel.

Other novel features and advantages of the invention will appear from the following description and by the claims appended thereto, reference being had to the accompanying drawings in which:

Figure 1:
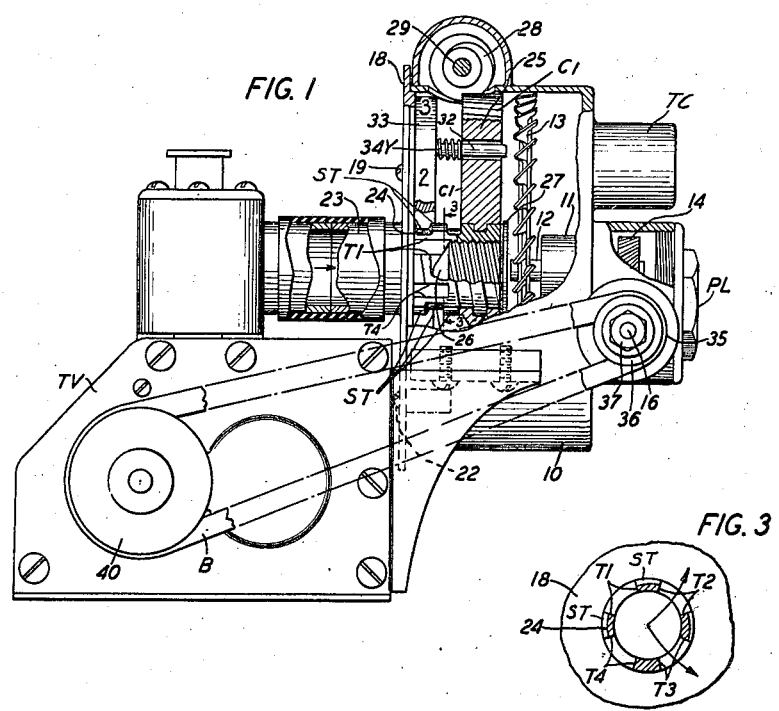
Fig. 1 is a side elevation of the turbine shown secured on a mounting formed with a ticket receiving apparatus, the turbine being shown with a number of operating parts partly in section.
Figure 3:
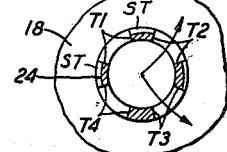
Fig. 3 is a vertical sectional view taken on line 3—3 of Fig. 1.
Figure 2:
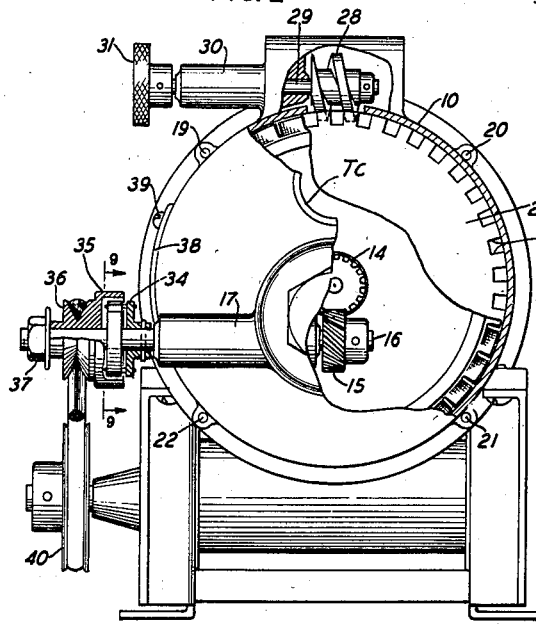
Fig. 2 is a front view showing the clutching mechanism in section and with a number of operating parts with portions broken away to show the notched wheel adjusting mechanism more clearly.
Figure 9:
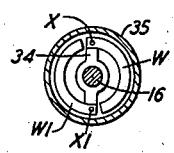
Fig. 9 is a vertical sectional view taken on line 9—9 of Fig. 2.

The turbine of the invention, Figs. 1 and 2, consists of a circular casing 10 formed with an internally and centrally disposed bearing portion 11 provided for rotatably mounting a shaft 12 to one end of which is keyed a rotor wheel 13 and on the opposite end of this shaft is keyed a right-angle gear 14. This gear meshes with an angle gear 15 keyed on one end of a shaft 16 journaled in a bearing 17 formed with the casing 10. The gears 14 and 15 are enclosed in a compartment formed with the casing 10 closed at its front end by a screw-threaded plug PL shown in Figs. 1, 2, 4 and 5 and on the other end of shaft 16 as shown in Figs. 2 and 9 is mounted a centrifugally operating clutch mechanism which will be hereinafter described in detail. A cover member 18 is secured to the casing 10 by a plurality of screws 19, 20, 21 and 22 best seen in Fig. 2. Cover 18 is provided on one side thereof with a centrally disposed tubing connection 23 and on the opposite side with a hub portion 24 coaxially disposed relative to tubing connection 23. The hub portion 24 of cover 18 as shown in Figs. 1 and 3 is provided at its periphery with a so-called square screw thread st for receiving the similarly screw-threaded centrally located opening in a wheel 25 having a plurality of helically forced notches or serrations CI at its periphery as shown in Figs. 1 and 2 provided for directing the air against the fins of rotor wheel 13, the air passing through tubing connection 23 and entering the chamber formed by the cover 18, the casing 10 and the wheel 25 through radial slots, T1, T2, T3 and T4 cut through the wall of the screw-threaded hub 24.

Figure 5:
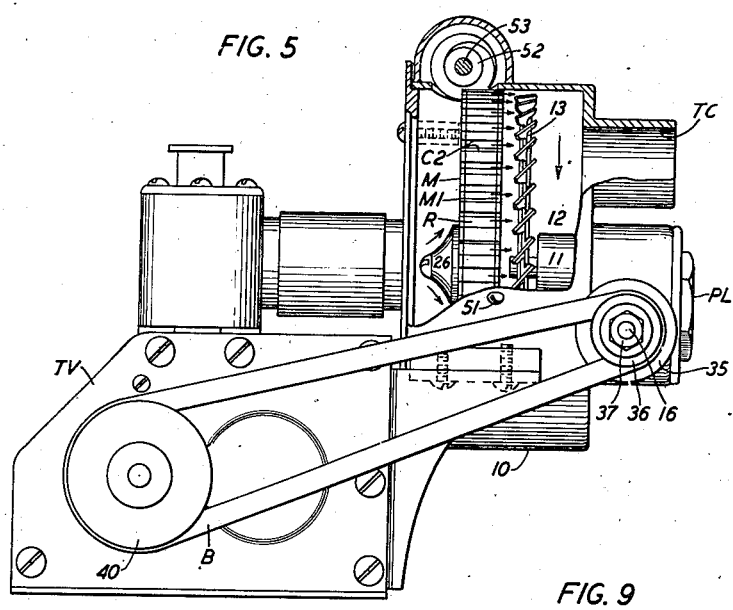
Fig. 5 is a modification of the air turbine shown in Fig. 1 showing the normal operative relation of the rotor wheel and the adjustable wheel.

A cone member 26 shown in Figs. 1 and 5 is secured at the end of hub 24 to assist in deflecting the air toward the periphery of wheel 25 while a flange or collar 27 formed with cone member 26 serves as a stop for the wheel 25 when rotated on the screw-threaded hub 24 as by the rotation of a worm screw 28 engaging the serrations C1 of the wheel 25 and keyed on one end of a rotatable shaft 29. This shaft is journaled in a bearing 30 formed integrally and tangentially to casing 10 and is provided at its opposite end with a knob 31 for rotating the worm screw 28 and thereby the wheel 25 on the screw-threaded hub 24 for moving this wheel toward and away from the rotor wheel 13 for adjusting the space relation between this wheel and the serrated wheel 25 for changing the speed of the rotor due to eddy air currents formed by increasing the space relation between these wheels.

The indicating wheel 33 is provided with a plurality of equally spaced laterally extending studs 32 shown in Fig. 1 mounted for sliding movement in similarly sized holes in wheel 25, the indicating wheel 33 being held frictionally against the cover 18 by a plurality of springs 34y mounted on the studs 32 upon the movement of wheel 25 toward and away from the rotor wheel 13.

Figure 4:
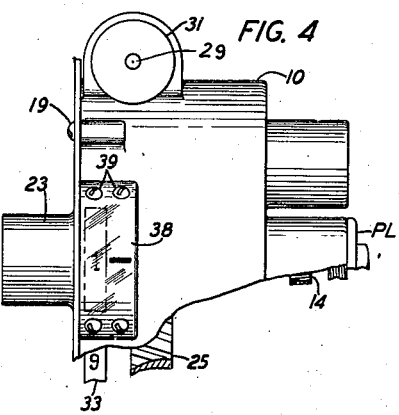
Fig. 4 is a partial view showing the indicator wheel in the mounting and the manually operable knob for actuating the adjustable wheel relative to the rotor wheel.

An indicator wheel 33 is provided with a scale in the form of numerals 1 to 10, inclusive, arbitrarily chosen for indicating the space relation between the serrated wheel 25 and rotor wheel 13, such numerals being visible through a window 38 of transparent material, such as Lucite, secured to casing 10 by a number of screws 39 as shown in Figs. 2 and 4.

On the end of shaft 16 opposite gear 15 is keyed a yoke member 34 shown in Figs. 2 and 9 provided for mounting as on pivots x and x1 the weights w and w1 disposed for rotation in a drum 35 formed with a power take-off member in the form of a V-grooved pulley 36 mounted for free rotation on the shaft 16, this pulley being held against lateral movement by a nut screw 37 engaging a similarly screw-threaded portion at the end of shaft 16.

In the operation of the air turbine of the invention as shown in Figs. 1, 2, 3 and 4 the stream of air entering the tubing connection 23 passes through the slots t1, t2, t3 and t4 to be deviated by the conical portion of plug 26 towards the periphery of adjustable wheel 25 thence passing through the notches or serrations C1 for impinging at substantially right angles against the fins of rotor wheel 13 for rotating the latter and thereby the shaft 16 through the engagement of the right angle gears 14 and 15. The operation of shaft 16 causes the pivotal movement of weights w and w1 carried by yoke 34 due to centrifugal force against the inner periphery of drum 35 for frictionally gripping this drum and thereby rotating the pulley 36 and a pulley 40 through a belt B for actuating, as in this example, the rollers of a ticket receiving valve TV through which the air passes following its propelling action on the tickets and prior to its entering through the casing 10 via tubing connection 23. According to this mechanism, supposing that the rotor wheel is momentarily stopped due to an overload on the pulley 36 of the power take-off shaft 16, under this condition the fly weights w and w1 are caused to release the drum 35 with the consequent resulting surge in the speed of the rotor wheel and the consequent reclutching of pulley 36 so as to overcome any load within predetermined limits tending to slow or stop the operation of the rotor wheel.

Upon the manual operation of knob 31 the wheel 25 is moved away from the rotor wheel 13 thus causing a decrease in its velocity due to eddy current formed in the space between the adjustable wheel 25 and the rotor wheel 13, the adjustable movement of wheel 25 toward the rotor wheel 13 being limited as above mentioned by the stop afforded by the collar 27 of cone 26.

Figure 6:
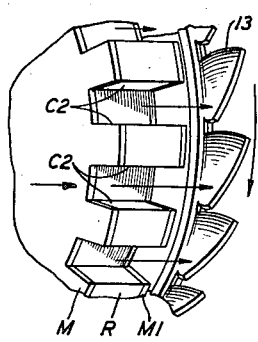
Fig. 6 is a partial view showing the adjustable wheel in position for directing the stream of air at substantially 45 degrees relative to the fins of the rotor wheels.
Figure 7:
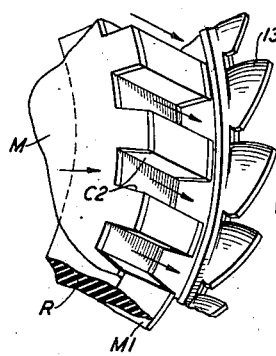
Fig. 7 is a view similar to that of Fig. 6 but showing the serrated wheel twisted for directing streams of air at substantially 90 degrees to the fins of the rotor wheel.
Figure 8:
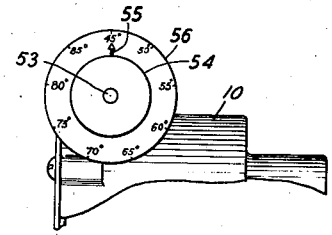
Fig. 8 is a partial view showing the dial for indicating the angle of twist of the adjustable wheel relative to the fins of the rotor wheel.

In the modification of the turbine of the invention as shown in Figs. 5, 6, 7 and 8 the adjustable wheel consists of a rubber ring R united to two metallic discs M and M1, the ring R and the discs M and M1 having peripherally disposed registering serrations as C2 with the metallic disc M1 keyed to the casing 10 by a set screw 51, while a worm 52 keyed on one end of shaft 53 engages the serrations of metallic disc M for rotating the latter relative to metallic disc M1 and thereby imparting a twisting movement to the rubber ring R, from the position shown in Figs. 5 and 6 to the position shown in Fig. 7 for changing the angle at which the streams of air as directed by the serrations impinge on the fins of rotor wheel 13 thus providing an adjustment for controlling the operation of this wheel according to pressure variation of the air stream in the ticket sending tubes connecting with the ticket receiving and sending valves, the stream of air passing through a tubing connection TC formed with casing 10 connected to other apparatus of the pneumatic system shown in Fig. 8 secured to the opposite end of shaft 53 being provided with a pointer 55 for movement on the face of the dial 56 carried by the casing 10 for indicating the angle of the serrations of the rubber ring R relative to the plane of the fins of rotor wheel 13 following each adjustment of the ring.

What is claimed is:

1. An air turbine comprising a rotor wheel having fin elements at its periphery, an adjustable wheel having screw threads forming air paths at its periphery for directing streams of air toward said fin elements for actuating said rotor wheel, and a rotatable worm operatively engaging said screw threads for rotating said wheel to move it in different spaced positions relative to said rotor wheel for controlling the speed of the latter acording to pressure variations of the air streams impinging on the fin elements of said rotor wheel.

2. An air turbine comprising a rotor wheel having fin elements at its periphery, another wheel having screw threads at its periphery forming air paths, a casing forming a housing for each of said wheels and having an air outlet path, a cover for said casing having an inlet tubing connection centrally disposed for leading the air into said casing and through said screw threads for impinging on the fin elements of said rotor wheel for actuating the latter, means engaging said screw threads for moving the second-mentioned wheel toward and away from said rotor wheel for controlling the speed of the latter, a gearing mechanism actuated by said rotor wheel and a power take-off shaft actuated by said gearing mechanism.

3. An air turbine comprising a rotor wheel having fin elements at its periphery, a wheel having screw threads at its periphery for directing streams of air at an angle toward the fins of said rotor wheel for actuating it, manually actuating means operatively engaging said screw threads for moving said wheel for changing the angle of said screw threads relative to the fin elements of said rotor for controlling the speed of the latter according to speed variations of the air streams impinged on the fin elements of said rotor wheel, and means set by the operation of said manually operable means for indicating the angle of said screw threads.

4. An air turbine comprising a rotor wheel, an adjustable wheel disposed in axial alignment with said rotor wheel having fin elements at its periphery, a casing for housing said adjustable wheel and said rotor wheel, said adjustable wheel consisting of two metallic discs and a ring of elastic material placed between said discs and united thereto, means formed at the periphery of said discs and said ring forming air paths, means for securing one of said discs against rotation in said casing and manually operable means for rotating the other of said discs for twisting said elastic ring for changing the direction of said air paths relative to the fin elements carried by said rotor wheel.

5. In an air turbine, a casing, a cover cooperating with said casing to form a housing, a tubing connection formed with said cover, a screw-threaded hub having radial air paths formed with said cover opposite the tubing connection and concentric thereto, a wheel mounted in the casing in threaded engagement with said hub, a bearing formed with said casing disposed coaxially to said screw-threaded hub, a rotor wheel having a shaft journaled in said bearing, said rotor wheel having a plurality of peripherally disposed fin members disposed at an angle relative to its plane of rotation, means carried by the first-mentioned wheel for directing the air from said tubing connection toward said fin members for actuating said rotor wheel, and a manually operable worm for rotating the first-mentioned wheel on said screw-threaded hub for changing the space relation between this wheel and said rotor wheel to cause a change in speed of the latter.

6. An air turbine comprising a rotor wheel having fin elements at its periphery, an adjustable wheel having means at its periphery for directing air streams at an angle relative to said fin elements for actuating said rotor wheel, a casing for housing said rotor wheel and said adjustable wheel, a cover for said casing having a screw-threaded hub portion for receiving said adjustable wheel, manually operable means for rotating said adjustable wheel on said hub for moving it toward and away from said rotor wheel for controlling the speed of the latter relative to pressure variation of the air impinging on said fin elements, a third wheel, a plurality of studs carried by said third wheel mounted for lateral sliding movement on said adjustable wheel, spring means disposed between said adjustable wheel and said third wheel for holding the latter in adjusted position against said cover upon the movement of said adjustable wheel toward or away from said rotor wheel, and means carried by said third wheel for indicating the position of said adjustable wheel relative to said rotor wheel.

7. In an air turbine, a rotor wheel having fins at its periphery, another wheel comprising a pair of discs having serrations at their peripheries and a ring of elastic material secured between said discs and having serrations at its periphery registering with the serrations at the peripheries of said discs to form air paths, a casing, a cover cooperating with said casing to form a housing for said wheels, said cover having an inlet tubing connection for leading the air into said casing and through said air paths for impinging on the fins of said rotor wheel for actuating the latter, means for securing one of said discs against movement in said casing, a worm engaging the serrations of the other of said discs, manually operable means for rotating said worm for rotating the last-mentioned disc relative to the other disc to cause a twisting movement of said ring for changing the direction of said air paths and thereby the direction of the air streams impinging on the fins of said rotor wheel for controlling the operation of the latter, and means set by the operation of said worm for indicating the angle of said air paths relative to the fins of said rotor wheel.

EDGAR W. GENT.